(12) United States Patent
Mellis et al.

(10) Patent No.: US 7,665,777 B2
(45) Date of Patent: Feb. 23, 2010

(54) BUMPER BEAM FOR A MOTOR VEHICLE

(75) Inventors: Jeffery Jay Mellis, Bloomfield Hills, MI (US); Gianfranco Gabbianelli, Troy, MI (US); Erryn Leigh Langlois, Windsor (CA); Mark A. Kessen, Shelby Township, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 11/629,947

(22) PCT Filed: Jun. 30, 2005

(86) PCT No.: PCT/CA2005/001021
§ 371 (c)(1),
(2), (4) Date: Dec. 18, 2007

(87) PCT Pub. No.: WO2006/002531
PCT Pub. Date: Jan. 12, 2006

(65) Prior Publication Data
US 2008/0203740 A1    Aug. 28, 2008

Related U.S. Application Data

(60) Provisional application No. 60/584,150, filed on Jul. 1, 2004.

(51) Int. Cl.
*B60R 19/02* (2006.01)
(52) U.S. Cl. ........................ 293/102; 293/120
(58) Field of Classification Search ................. 296/102, 296/187.03, 187.09; 293/102, 120
See application file for complete search history.

(56) References Cited

U.S. PATENT DOCUMENTS

| 3,850,474 | A | * | 11/1974 | Welch | 296/181.2 |
| 3,926,463 | A | * | 12/1975 | Landwehr et al. | 293/136 |
| 4,116,480 | A | * | 9/1978 | Crestetto | 293/102 |
| 5,154,462 | A | * | 10/1992 | Carpenter | 293/120 |
| 5,462,325 | A | * | 10/1995 | Masuda et al. | 293/102 |
| 5,997,058 | A | * | 12/1999 | Pedersen | 293/102 |
| 6,398,275 | B1 | * | 6/2002 | Hartel et al. | 293/102 |
| 6,926,320 | B2 | * | 8/2005 | Garcia et al. | 293/102 |

(Continued)

FOREIGN PATENT DOCUMENTS

WO        9407709    A1    4/1994

(Continued)

*Primary Examiner*—Glenn Dayoan
*Assistant Examiner*—Gregory Blankenship
(74) *Attorney, Agent, or Firm*—Donald G. Walker; Harness, Dickey & Pierce, P.L.C.

(57) ABSTRACT

A bumper beam for mounting to a frame assembly of a motor vehicle at one end of the motor vehicle includes opposing end portions adapted to be mounted to the frame assembly of the motor vehicle and a centrally disposed intermediate portion extending between the end portions. The end portions and the intermediate portion define an upper wall, a lower wall, and a central wall between the upper and lower walls. The upper and lower walls each have an elongated arcuate flange that extends from a free end of a respective upper and lower wall along a length of the bumper beam. The arcuate flange of each of the upper and lower walls defines an outwardly facing concave surface and an inwardly facing convex surface.

14 Claims, 3 Drawing Sheets

U.S. PATENT DOCUMENTS

| | | | |
|---|---|---|---|
| 6,971,690 B2 * | 12/2005 | Evans et al. | 293/102 |
| 7,044,515 B2 * | 5/2006 | Mooijman et al. | 293/120 |
| 7,163,241 B2 * | 1/2007 | Liu et al. | 293/102 |
| 7,316,432 B2 * | 1/2008 | Muskos | 293/102 |
| 7,357,430 B2 * | 4/2008 | Karlander | 293/102 |
| 7,399,013 B2 * | 7/2008 | Lutke-Bexten et al. | 293/102 |
| 7,407,219 B2 * | 8/2008 | Glasgow et al. | 296/187.03 |
| 2009/0066095 A1 * | 3/2009 | Karlander | 293/102 |

FOREIGN PATENT DOCUMENTS

| | | |
|---|---|---|
| WO | WO 99/20490 | 4/1999 |
| WO | 0238418 A1 | 5/2002 |
| WO | WO 2004/108482 | 12/2004 |
| WO | WO 2005/054011 | 6/2005 |
| WO | 2005080141 A1 | 9/2005 |

* cited by examiner

BUMPER BEAM FOR A MOTOR VEHICLE

FIELD OF THE INVENTION

The present invention relates to a bumper beam for a motor vehicle.

BACKGROUND OF INVENTION

Automotive designers are continually trying to balance the need for lightweight, fuel efficient automobiles with safety standards and regulations imposed by the government and insurance companies. One such automotive component subject to heavy regulation is bumper assemblies with regard to crash safety standards. The bumper assembly is traditionally comprised of a bumper beam made of a metallic material with the requisite strength to conform to governmental standards for low and high speed crashes. Often, the strong metallic beam is heavy and adds significant weight to the vehicle thereby reducing fuel efficiency. There is a need in the automotive industry to develop a bumper assembly having a bumper beam with an increased strength to weight ratio by lowering the overall weight of the bumper assembly. The improved bumper assembly must still be strong enough to provide excellent performance in high speed and low speed crashes.

Automotive manufacturers desire components that are affordable and easy to produce in a mass production operation. Traditional bumper assemblies are roll-formed whereby a flat steel strip passes through a series of rollers to shape the steel into a desired form, as shown in U.S. Pat. No. 6,360,441. Complex bumper beam designs, while providing the necessary strength to conform to safety standards, add to the time and cost of the manufacturing process. There is a need in the automotive industry to produce a bumper beam that provides strength adequate to conform to safety standards, lightweight to improve fuel efficiency and simple to manufacture.

SUMMARY OF THE INVENTION

The disadvantages of the prior art may be overcome by providing a hot stamped bumper beam formed from a high strength steel into a desired configuration that is optimized to provide the requisite strength.

One aspect of the invention relates to a bumper beam for a motor vehicle. The bumper beam has opposing end portions adapted to be mounted to the frame assembly of the motor vehicle and a centrally disposed, intermediate portion extending longitudinally between the end portions. The intermediate portion has a first section having a first height, and second and third sections on opposite sides of the first section with each of the second and third sections having a height that is less than the first height. The end portions and the intermediate portion has an elongated arcuate flange that extends along a length of the bumper beam and define an outwardly facing concave surface and an inwardly facing convex surface.

Another aspect of the invention relates to a bumper beam for a motor vehicle. The bumper beam additionally has a stiffening member for adding strength and rigidity to the bumper beam while reducing the weight of the bumper beam.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
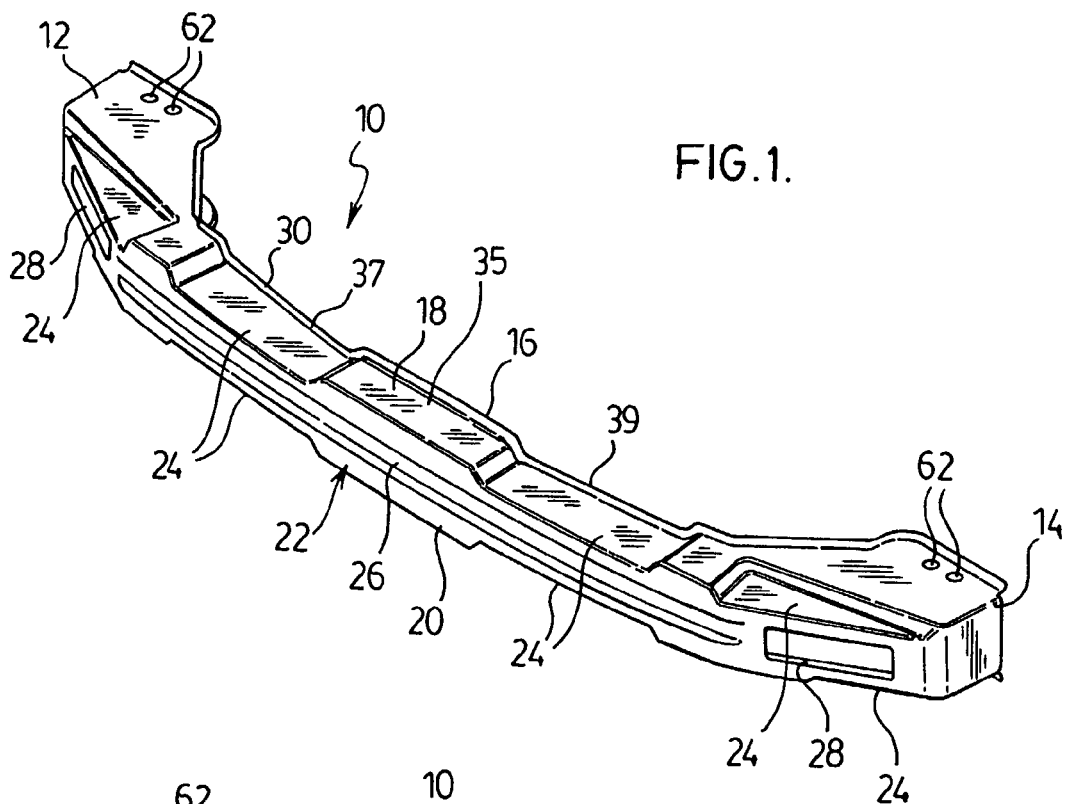
FIG. 1 is a front perspective view illustrating a bumper beam constructed in accordance with an embodiment of the invention.
Figure 2:
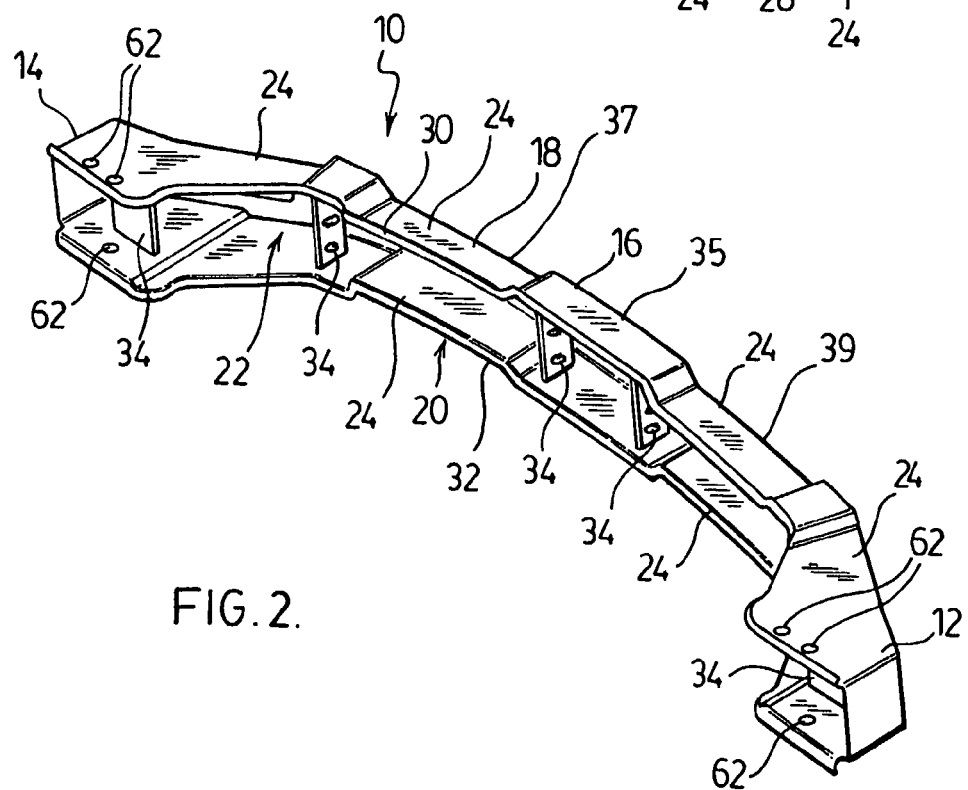
FIG. 2 is a rear perspective view illustrating the bumper beam shown in FIG. 1.
Figure 3:
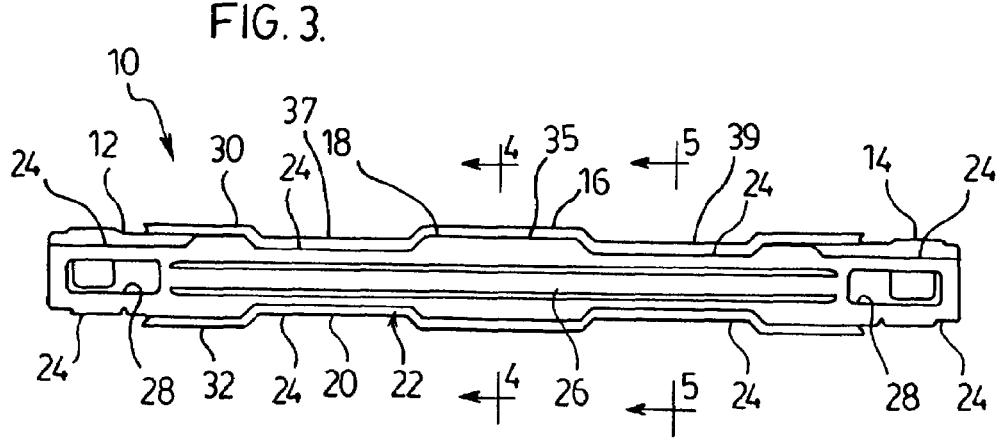
FIG. 3 is a front view of the bumper beam shown in FIG. 1.

FIGS. 1-3 illustrate a bumper beam 10 for a motor vehicle constructed according to an embodiment of the present invention. The bumper beam 10 is structured to be mounted to a frame assembly of the motor vehicle at either the front end or the rear end of the motor vehicle. The bumper beam 10 may be utilized on any suitable motor vehicle. As is conventional, the bumper beam 10 is structured to receive collision forces during a front end or rear end collision. An example of a prior art bumper is disclosed in U.S. Pat. No. 6,406,081 to Mahfet et al.

The bumper beam 10 is preferably formed from an elongated piece of sheet metal, e.g., high strength steel or ultra high strength steel. The sheet metal is formed to provide a one-piece bumper beam 10 with opposing end portions 12, 14 and a centrally disposed intermediate portion 16 extending between the end portions 12, 14. The sheet metal is also bent to impart a longitudinal curvature to the bumper beam 10.

Preferably, the sheet metal is formed into the desired shape of the bumper beam 10 from a blank of sheet metal utilizing by a hot stamping operation. In a hot stamping operation, a flat metal blank is heated to its austenitic temperature and positioned in a hot stamping press with complementary dies contoured as described below. The blank is shaped in a single stroke to the desired shape. The shaped blank is then allowed to cool and harden while in the dies.

The bumper beam 10, which can vary in length and longitudinal curvature to suit various vehicle widths and contours, is mounted to the frame assembly of the vehicle by bolting or welding each end portion 12, 14 to the frame assembly.

As shown in FIGS. 1-3, the bumper beam 10 is an open generally C-shaped channel with end portions 12, 14 and intermediate portion 16 that define an upper wall 18, a lower wall 20, and a central wall 22 between the upper and lower walls 18, 20. The upper and lower walls 18, 20 are each formed to have a non-planar configuration with several recessed portions 24.

The central wall 22 is also formed to have a non-planar configuration with an elongated recessed portion 26 along a portion of the length, and openings 28 adjacent opposing ends of the recessed portion 26. Further, the free ends of the upper and lower walls 18, 20 have an elongated arcuate flange 30 along an upper extent of the bumper beam 10 and an elongate arcuate flange 32 along a lower extent of the bumper beam 10.

Additionally, brackets and/or stiffening members 34 are attached between the upper and lower walls 18, 20, e.g., by welding, to facilitate connection to the frame assembly of the vehicle and to add rigidity/reinforcement to the bumper beam 10. For example, FIG. 2 shows bracket/stiffening members 34 in the intermediate portion 16, and a bracket/stiffening member in each of the end portions 12, 14.

As seen in FIGS. 1-3, and as best seen in FIG. 3, the height of the beam 10 varies along its length. A mid-section 35 has a height that is greater than the recessed portions 37 and 39 that are on opposite sides of the mid-section 35. The recessed portions 37 and 39 also have a smaller height than the end portions 12 and 14. The heights of the various sections can vary according to the desired structural characteristics of the beam 10. The heights of the recessed portions 37 and 39 can be substantially the same. Also, the heights of the mid-section 35 and the end portions 12 and 14 can be substantially the same. Further, the heights of the end portions 12 and 14 can be different than the mid-section 35. Still further the end sections 12 and 14 can have a portion that is the same height as the mid-section 35 and a portion that is at a different height than the mid-section 35. The heights of the various sections can also vary along the length of the beam 10.

Figure 4:
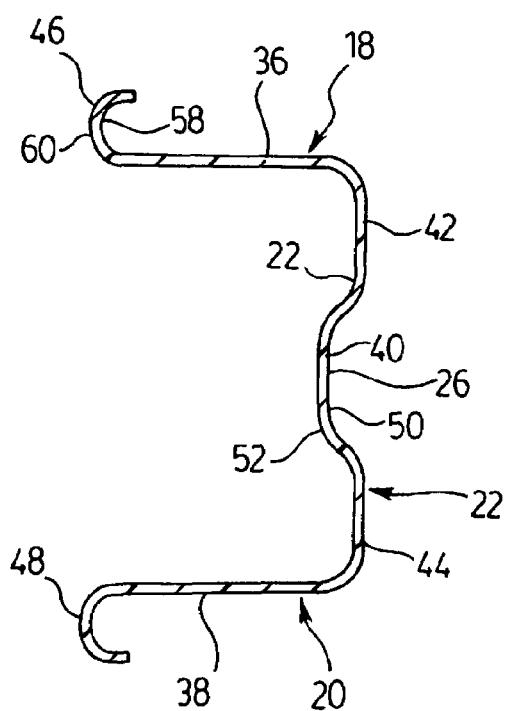
FIG. 4 is a cross-sectional view through line 4-4 of FIG. 3.

As the heights of the various sections of the beam 10 vary, so too can the cross-sectional configurations. As seen in FIG. 4, the upper curved flange 46 has a smaller height than the upper curved flange 46 of FIG. 5. Also, the upper curved flange 46 in FIG. 4 has a smaller height than the lower curved flange 48 in both FIG. 4 and FIG. 5.

The varying heights, e.g., via recessed portions 24, and openings 28 of the bumper beam 10 reduces the size and hence overall weight of the bumper beam 10. However, the varying heights and openings are optimized to provide a bumper beam 10 with sufficient coverage for vehicle safety requirements. Moreover, the incorporation of the curved flanges 30, 32 and bracket/stiffening members 34, for example, provides a bumper beam 10 with sufficient strength and structural rigidity.

In the illustrated embodiment, the desired shaped of the bumper beam 10 is formed by varying the transverse cross-sectional configuration of the bumper beam 10 along the length of the bumper beam 10. Specifically, the bumper beam 10 is formed such that the end portions 12, 14 have similar transverse cross-sectional configurations. However, the end portions 12, 14 may have different configurations from one another. Also, the bumper beam 10 is formed such that the transverse cross-sectional configurations of the end portions 12, 14 are different than the transverse cross-sectional configuration of the intermediate portion 16. Moreover, the transverse cross-sectional configuration of each the end portions 12, 14 varies along its length, and the transverse cross-sectional configuration of the intermediate portion 16 varies along its length.

Figure 5:
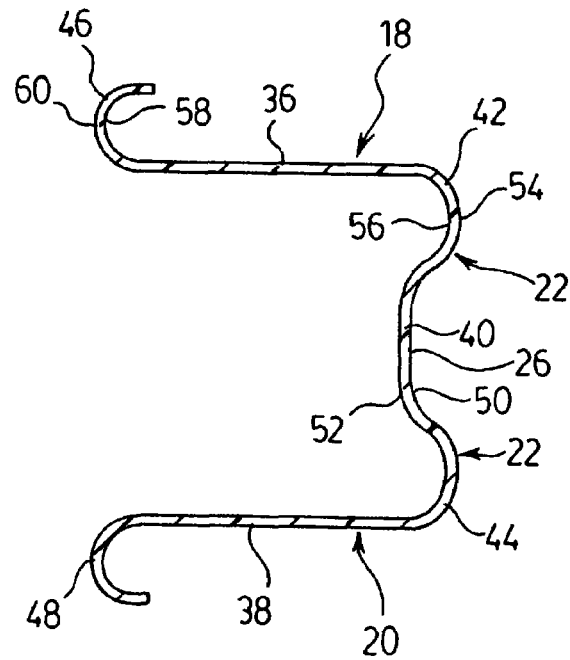
FIG. 5 is a cross-sectional view through line 5-5 of FIG. 3.

For example, as best shown in FIGS. 4 and 5, each transverse cross-section of the intermediate portion 16 of the bumper beam 10 includes an upper horizontally extending wall section 36, a lower horizontally extending wall section 38, an arcuate central wall section 40, and connecting wall sections 42, 44 that interconnect ends of the upper and lower horizontally extending wall sections 36, 38 with respective ends of the arcuate central wall section 40. Also, arcuate flange sections 46, 48 extend from opposite ends of the upper and lower horizontally extending wall sections 36, 38.

In the illustrated embodiment, the size and configuration of the wall sections 36, 38, 40, 42, 44 and flange sections 46, 48 of the intermediate portion 16 may vary along the length of the intermediate portion 16, which varies the transverse cross-sectional configuration of the intermediate portion 16 along the length thereof.

As shown in FIGS. 4 and 5, the length of the upper and lower horizontally extending wall sections 36, 38 vary along the length of the intermediate portion 16, e.g., the upper and lower horizontally extending wall sections 36, 38 in FIG. 4 are shorter than the upper and lower horizontally extending wall sections 36, 38 in FIG. 5. This variation in length of the upper and lower wall sections 36, 38 defines the longitudinal curvature of the bumper beam 10.

The size and configuration of the arcuate central wall section 40 is substantially similar along the length of the intermediate portion 16. As shown in FIGS. 1, 4, and 5, the arcuate central wall section 40 has an elongated generally C-shape configuration that provides an outwardly facing concave surface 50 and an inwardly facing convex surface 52. These arcuate central wall sections 40 define the elongated recessed portion 26 along the length of the intermediate portion 16.

As shown in FIGS. 4 and 5, the length and shape of the connecting wall sections 42, 44 vary along the length of the intermediate portion 16, e.g., the connecting wall sections 42, 44 in FIG. 5 are shorter and have a more arcuate shape than the connecting wall sections 42, 44 in FIG. 4. Specifically, the arcuate connecting wall sections 42, 44 in FIG. 5 each have an open generally C-shape configuration that provide an outwardly facing convex surface 54 and an inwardly facing concave surface 56. In contrast, the connecting wall sections 42, 44 in FIG. 4 each extend generally vertically. This variation in length and shape of the connecting wall sections 42, 44 defines the various recessed portions 24 in the upper and lower walls 18, 20 of the bumper beam 10.

As shown in FIGS. 4 and 5, the arcuate flange sections 46, 48 have a substantially similar configuration along the length of the intermediate portion 16. Specifically, the arcuate flange sections 46, 48 each have a generally C-shape configuration that provides an outwardly facing concave surface 58 and an inwardly facing convex surface 60. However, the size of the arcuate flange sections 46, 48 varies along the length of the intermediate portion 16, e.g., the arcuate flange sections 46, 48 in FIG. 4 have a shorter height than the height of the arcuate flange sections 46, 48 shown in FIG. 5. These arcuate flange sections 46, 48 define the elongated curved flanges 30, 32 along the length of the intermediate portion 16.

Although the cross-sections of FIGS. 4 and 5 illustrate cross-sections through the intermediate portion 16, the general configuration of the cross-sections illustrated in FIGS. 4 and 5 can be employed throughout the length of the bumper 10, including the end portions 12 and 14. As illustrated in FIGS. 1-3, the end portions 12 and 14 have a cross-sectional configuration substantially similar to those illustrated in FIGS. 4 and 5 except that the end portions 12 and 14 include openings 28 extending through the central wall 22 in place of a recessed portion 26. However, the bumper 10 can be configured so that the recessed portion 26 extends into the end portions 12 and 14, respectively, either in combination with the openings 28 or in place of the openings 28. As seen in FIGS. 1-3, the arcuate flange sections 46 and 48 preferably extend along the entire length of the bumper 10, including the intermediate portion 16 and the end portions 12 and 14.

As best shown in FIGS. 1-3, the upper and lowers walls 18, 20 of each end portion 12, 14 vary in width to define end portions 12, 14 that are wider than the intermediate portion 16. Also, the upper and lower walls 18, 20 of the end portions 12, 14 have a stepped configuration to define the respective recessed portions 24.

One or more openings 62 are provided in each of the upper and lower walls 18, 20 of the end portions 12, 14 for mounting the end portions 12, 14 to the frame assembly of the vehicle. For example, fasteners, such as bolts, may extend through respective openings 62 in the end portions 12, 14 and through corresponding openings provided in the frame assembly of the vehicle to mount the bumper beam 10 to the vehicle in an operative position. However, the end portions 12, 14 of the bumper beam 10 may be secured to the vehicle in any other suitable manner, e.g., by welding. Moreover, the end portions 12, 14 of the bumper beam 10 may have any suitable structure to facilitate connection to the vehicle.

The central wall 22 of each end portion 12, 14 includes an opening 28, in the form of a rectangular-shaped opening, formed therethrough. However, the openings 28 may have different configurations and may be formed though other portions of the bumper beam 10. The openings 28 can reduce the weight of the bumper beam 10, can provide mechanisms for attachment to other structural elements, and can permit elements such as lights to pass there through.

The openings 28, 62 in the end portions 12, 14 may be pierced in a piercing operation that is an integral part of the forming operation, e.g. hot stamping. However, the openings 28, 62 may be pierced in a piercing operation that is separate from the forming operation, e.g., laser cut.

The arcuate flanges 30, 32 of each end portion 12, 14 are continuous with the arcuate flanges 30, 32 of the intermediate portion 16 to provide elongated curved flanges along the length of the bumper beam 10 that adds strength and rigidity to the bumper beam 10.

Figure 6:
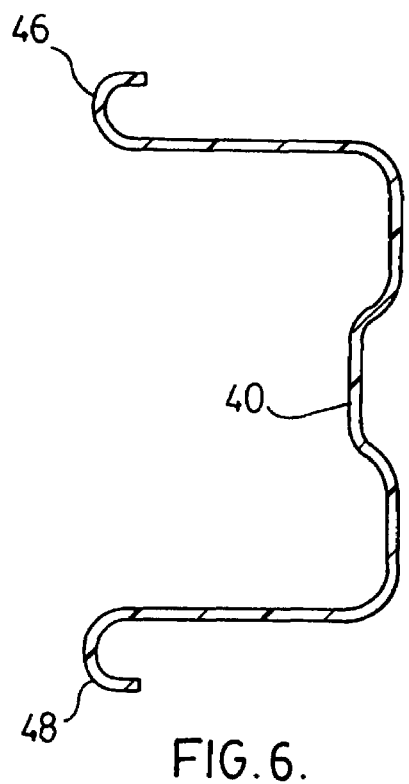
FIG. 6 is a cross-sectional view similar to FIG. 4, but showing possible dimensions for an embodiment of the invention.
Figure 7:
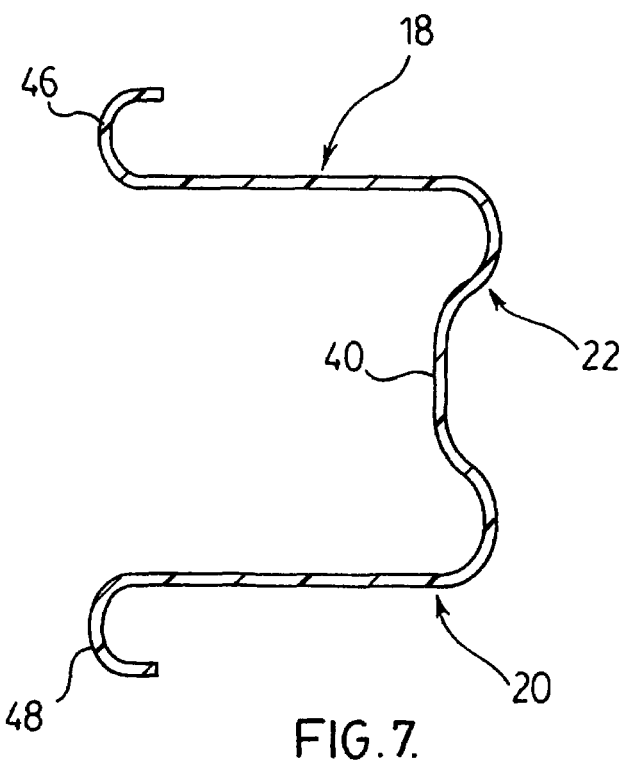
FIG. 7 is a cross-sectional view similar to FIG. 5, but showing possible dimensions for an embodiment of the invention.

FIGS. 6 and 7 illustrate possible dimensions of the elements discussed with respect to FIGS. 4 and 5, respectively. It should be understood that the dimensions in FIGS. 6 and 7 are only one example of the dimensions and proportions of the various elements illustrated.

It should be understood that the bumper beam 10 illustrated is only exemplary, and the transverse cross-sectional configurations of the bumper beam 10 along the length thereof may be suitably varied to meet the size and safety requirements for a particular vehicle.

The foregoing specific embodiments have been provided to illustrate the structural and functional principles of the present invention, and are not intended to be limiting. To the contrary, the present invention is intended to encompass all modifications, alterations, and substitutions within the scope of the appended claims.

What is claimed is:

1. A bumper beam for a motor vehicle, said bumper beam hot stamped from a flat metal blank into an open generally C-shaped channel, and comprising:
    opposing end portions; and
    a centrally disposed, intermediate portion extending longitudinally between said end portions,
    said intermediate portion having a first section having a first height, and second and third sections on opposite sides of said first section with each of said second and third sections having a height that is less than said first height,
    said bumper beam having an elongated arcuate flange that extends along an upper and lower extent thereof, wherein said height of each of said second and third sections of said intermediate portion are substantially equal, and further wherein said height of said first section of said intermediate portion and said height of each of said end portions are substantially equal.

2. A bumper beam for a motor vehicle, said bumper beam hot stamped from a flat metal blank into an open generally C-shaped channel, and comprising:
    opposing end portions; and
    a centrally disposed, intermediate portion extending longitudinally between said end portions,
    said intermediate portion having a first section having a first height, and second and third sections on opposite sides of said first section with each of said second and third sections having a height that is less than said first height,
    said bumper beam having an elongated arcuate flange, being arcuate in cross section, that extends along an upper and lower extent thereof, said arcuate flange having a varying height, wherein the flange height at said first section is less than the flange height at said second and third sections.

3. A bumper beam for a motor vehicle, said bumper beam hot stamped from a flat metal blank into an open generally C-shaped channel, and comprising:
    opposing end portions; and
    a centrally disposed, intermediate portion extending longitudinally between said end portions,
    said intermediate portion having a first section having a first height, and second and third sections on opposite sides of said first section with each of said second and third sections having a height that is less than said first height,
    said bumper beam having an elongated arcuate flange that extends along an upper and lower extent thereof, wherein each of said end portions has a height that is greater than said height of said second and third sections of said intermediate portion.

4. The bumper beam according to claim 2, wherein the upper extent of said elongated arcuate flange has a smaller height than a corresponding transverse lower extent of said elongated arcuate flange.

5. The bumper beam according to claim 2, wherein the upper extent of said elongated arcuate flange is substantially the same size as a corresponding lower extent of said elongated arcuate flange.

6. The bumper beam according to claim 5, further comprising: a stiffening member mounted within said open C-shaped channel.

7. The bumper beam according to claim 6, wherein said end portions each has one or more openings extending therethrough.

8. A bumper beam comprising:
    a monolithic channel having a substantially "C-shaped" cross-section with a substantially constant thickness, the channel including undulating upper and lower walls interconnected by a curved central wall, the upper and lower walls being spaced apart from one another a first distance at a midpoint of the channel and spaced apart a second different distance at locations on either side of the midpoint, wherein additional portions of the channel proximate the channel ends include the upper and lower walls being spaced apart a distance greater than the second distance.

9. The bumper beam according to claim 8, wherein the central wall includes a recessed outer surface.

10. The bumper beam according to claim 8, wherein the channel includes opposing end panels extending substantially perpendicularly from each of the upper wall, the lower wall and the central wall.

11. The bumper beam according to claim 8, wherein the upper and lower walls extend substantially parallel to one another.

12. The bumper beam according to claim 8 wherein the first distance is the greatest distance that the upper and lower walls are spaced apart.

13. The bumper beam according to claim 8, wherein the channel includes a first flange extending from the upper wall and a second flange extending from the lower wall.

14. The bumper beam according to claim 13, wherein the first and second flanges include arced cross-sectional shapes.

* * * * *